United States Patent

Viratelle et al.

[11] Patent Number: 5,496,074
[45] Date of Patent: Mar. 5, 1996

[54] QUICK CONNECTION

[75] Inventors: Henri Viratelle, Mont St Sulpice; Michel Andre, Romorantin, both of France

[73] Assignee: Etablissements Caillau, Moulineaux, France

[21] Appl. No.: 375,602

[22] Filed: Jan. 20, 1995

[30] Foreign Application Priority Data

Jan. 26, 1994 [FR] France ................................. 94 00829

[51] Int. Cl.⁶ ..................................................... F16L 11/12
[52] U.S. Cl. ............................ 285/45; 285/86; 285/315; 285/319; 285/320; 285/921
[58] Field of Search ............................... 285/319, 921, 285/86, 45, 315, 320

[56] References Cited

U.S. PATENT DOCUMENTS

| 461,751 | 10/1891 | Goldman | 285/319 X |
|---|---|---|---|
| 3,711,125 | 1/1973 | Dehar | 285/319 X |
| 4,778,203 | 10/1988 | Bartholomew | 285/319 X |
| 4,969,667 | 11/1990 | Sauer | 285/319 X |
| 5,067,754 | 11/1991 | Bartholomew | 285/319 |
| 5,112,086 | 5/1992 | Gruba et al. | 285/86 |
| 5,380,051 | 1/1995 | Breuhan | 285/319 X |

FOREIGN PATENT DOCUMENTS

| 0364380 | 4/1990 | European Pat. Off. . |
|---|---|---|
| 0484690 | 5/1992 | European Pat. Off. . |
| 2174163 | 10/1986 | United Kingdom . |
| 9320379 | 10/1993 | WIPO . |

Primary Examiner—Dave W. Arola
Attorney, Agent, or Firm—Marshall & Melhorn

[57] ABSTRACT

A quick connector is provided for connecting a tube inserted into a connection element. The tube includes an annular swell spaced at a distance from its end. The connector housing of the connection element is provided with a locking member and locking ring elastically deformable in a radial direction between a free state configuration and an unlocking configuration. The outer periphery of the connector housing has two cylindrical parts separated by an axial stop. The locking ring abuts the axial stop. A locking lug is connected to the locking ring and includes a front ramp with a transverse slot. A spacer deforms the locking lug in a radially outward direction to the unlocking configuration. When the tube is fitted in the connection element, the front ramp of the locking lug cooperates with the swell of the tube to move the lug apart. When the tube has been fitted in the connector and the slot is at the axial level of the swell, the locking lug approaches its free state configuration. The swell penetrates the slot and lug will adopt a locking configuration. The spacer can be activated without a tool to disconnect the tube from the connector.

13 Claims, 5 Drawing Sheets

5,496,074

QUICK CONNECTION

FIELD OF THE INVENTION

The present invention relates to a quick connection.

BACKGROUND OF THE INVENTION

Various types of quick connection for a rigid tube fitted in a connector to be axially locked thereon and in addition to ensure a tight connection of two pipes conveying a fluid such as fuel, are already known.

The French Patent Application filed by Applicants on May 10, 1993 under No. 93 05558, discloses, for a tube which presents an annular swell distant from its end, a connection- of which the connector presents an inner housing intended to receive at least one 0-ring and provided in a region which, when the tube is fitted in the connector, lies opposite that zone of said tube located between its end and the swell. This connector comprises a locking member comprising locking means elastically deformable in the radial direction between a configuration in the free state and a configuration of unlocking.

The locking means may adopt a locking configuration generally intermediate between their configuration in the free state and their configuration of unlocking, in which they abut on the swell of the tube, on the side opposite its end.

Such a known connection is satisfactory from the technical standpoint. However, the extraction of the tube from the connector after locking requires the use of a specific tool which must be inserted between the tube and the elastic locking means. This operation is delicate and can be successfully carried out only if the space around the tube and the connection is sufficient to allow a tool to be used.

It is an object of the present invention to improve the known connections further, by overcoming the drawbacks set forth hereinabove.

SUMMARY OF THE INVENTION

To that end, the outer periphery of the connector presents a first cylindrical part, delimited towards the inlet of the connector, i.e. towards the front, by axial stop means, and a second part extending between the axial stop means and the inlet of the connector.

The locking member comprises a ring capable of abutting on the axial stop means.

The locking means comprise at least one locking lug extending forwardly from the ring and comprising a first portion, connected to the ring and of length at least equal to the length of the second part of the connector, and a second portion constituted by a forward extension of said first portion and comprising, from front to rear, an inwardly inclined front ramp and a transverse slot whose axial dimension is at least equal to the axial dimension of the swell of the tube and of which the distance to the axis of the connector is, in the free state of the locking lug, less than the outer radius of said swell.

Spacer means connected to the connector, capable of being employed by hand without a tool, are provided to bring the locking lug into its configuration of unlockings, in which the distance from the slot to the axis of the connector is at least equal to the radius of the swell of the tube.

The number of parts which constitute the connection is limited, which renders industrial production thereof easy and economical. The ring of the locking member is located on the first cylindrical part of the outer periphery of the connector and may abut on the axial stop means. As will be seen hereinafter, this ring may be mounted fixed or sliding.

When the tube is fitted in the connector, the front ramp of the locking lug, inclined inwardly, cooperates with the swell of this tube to move the lug apart. When the tube has been fitted sufficiently in the connector and the slot is at the axial level of the swell, the locking lug will elastically approach its configuration in the free state, allowing the swell to penetrate in the slot, whose axial dimension is sufficient. Under the effect of its elasticity, the lug will naturally adopt its locking configuration, in which the front edge of the slot cooperates with the swell to prevent any disconnection of the tube and connector under the effect of traction intended to separate these two elements.

As will be seen hereinafter, the spacer means connected to the connector may be employed simply, without necessarily requiring the use of a tool. However, in order to fulfill the safety conditions, spacing will always result from an effort applied by the user, never fortuitously.

BRIEF DESCRIPTION OF THE DRAWINGS

The invention will be more readily understood on reading the following description of two embodiments given by way of non-limiting example, with reference to the accompanying drawings, in which.

DESCRIPTION OF PREFERRED EMBODIMENTS

Figure 1:
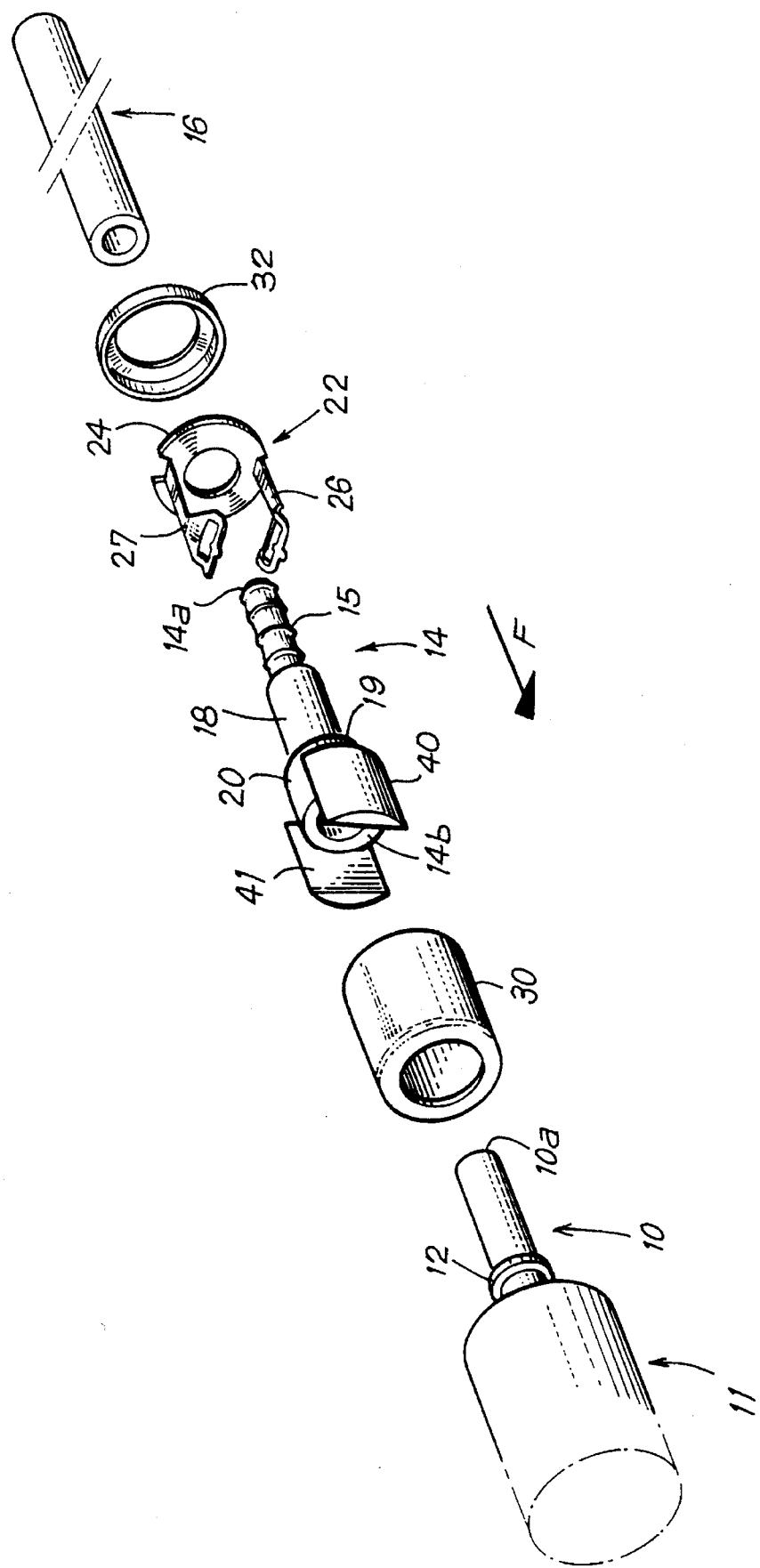
FIG. 1 is an exploded view in perspective of the various elements constituting the connection.

Referring now to the drawings, FIG. 1 shows a connection which comprises a tube 10, presenting an annular swell 12 distant from its end 10a and being located, for example, at the entry of a carburettor 11.

In addition, the connection comprises a connector 14 intended to be fitted on tube 10.

Towards its end 14a opposite tube 10, the connector may present a zone 15 of which the outer periphery is shaped as a notched connection, intended to be fitted in a supple pipe 16 such as a fuel conduit.

The "forward" direction is understood to mean the one, indicated by arrow F in FIG. 1, which goes from the end of the connector opposite the tube, to the entry of this connector. The "rearward" direction is, of course, the opposite direction. The "inward" direction is the one which approaches the axis of the tube or connector, the "outward" direction being the one which moves away therefrom.

The outer periphery of the connector presents a first cylindrical part 18 forwardly delimited by axial stop means 19, here constituted by a shoulder, and a second part 20 which extends between these axial stop means and the entry 14b of the connector 14.

The connection comprises a locking member 22 which comprising a ring 24, capable of being fitted on the first part 18 of the outer periphery of the connector and of abutting on the axial stop means 19. The locking member 22 comprises two elastically deformable locking lugs 26 and 27.

The connection preferably also comprises a sleeve 30 intended to cover the connector 14 and a crimping ring 32 intended to be crimped on the ring 24 to protect it and increase the thickness thereof.

In all the views in longitudinal section, it is seen that the connector 14 presents an inner housing 34 intended to receive at least one O-ring 35. As shown for example in FIG. 4, this housing is provided in a region of the connector which, when the tube 10 is fitted in the connector, lies opposite the zone located between the end 10a of this tube and the annular swell 12.

In the views in section, it is also observed that the outer diameter of the tube is substantially equal to the inner diameter of the connector.

In the example shown, the swell 12 comprises a front face 12a perpendicular to axis A, common to the tube and to the connector when the connection is assembled.

In these Figures, the locking member comprises two lugs, but it may comprise one only, or more.

Referring now to FIGS. 2 to 9, the connection will now be described more precisely in accordance with a first embodiment of the locking member.

In order to lighten the description, the locking member will comprise two locking lugs, without this being considered as a restriction.

The locking lugs 26 and 27 extend forwardly from the ring 24 and respectively comprise a first portion 26a, 27a and a second portion 26b, 27b. The first portion 26a, 27a is connected to the ring 24 and its length is at least equal to the length of the second part 20 of the connector 14. The second portion 26b, 27b is constituted by a forward extension of the first portion 26a, 27a and comprises, from front to rear, a front ramp 36a, 37a inclined inwardly and a transverse slot 36b, 37b.

Figure 2:
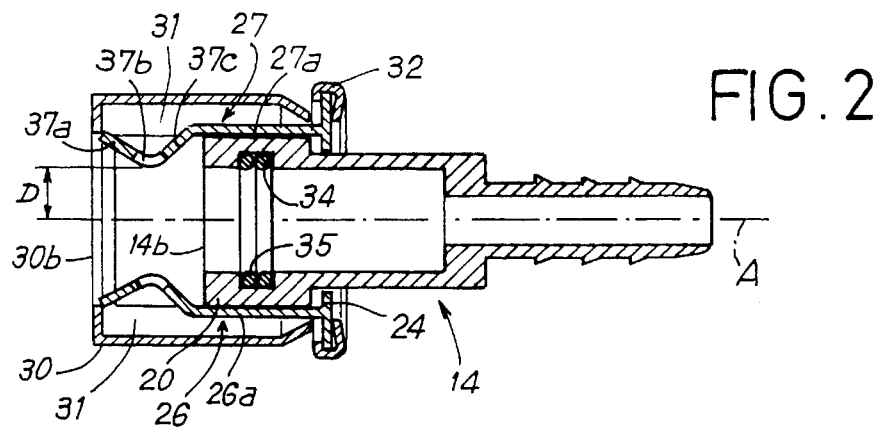
FIG. 2 is a longitudinal section of the connection without the tube, showing the locking means in their configuration in the free state.
Figure 3:
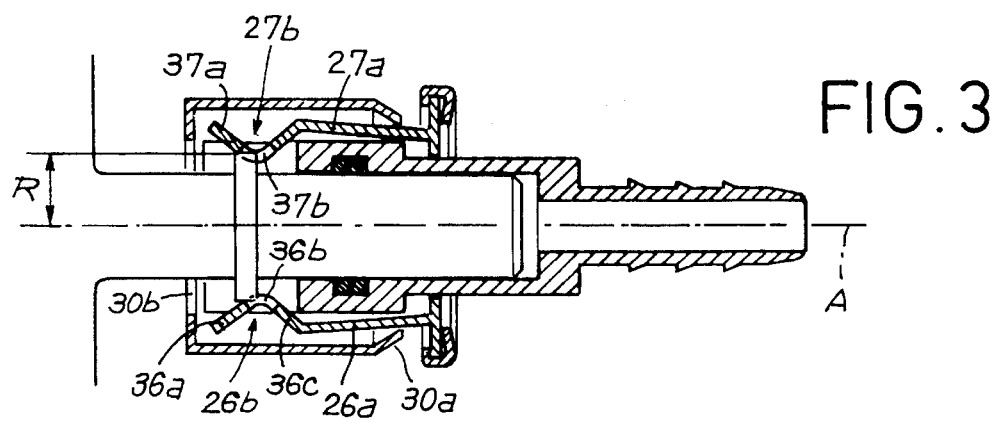
FIG. 3 is a section similar to that of FIG. 2, illustrating the configuration of the locking means when the tube is being fitted in the connector.

In FIG. 2 which shows the locking lugs 26 and 27 in their configuration in the free state, it is observed that the distance D from the slot 37b of lug 27 to axis A of the connector 14, or the distance from the slot 36b of lug 26 to the same axis A, is less than the outer radius R of the swell 12 of the tube 10, indicated in FIG. 3.

Figure 4:
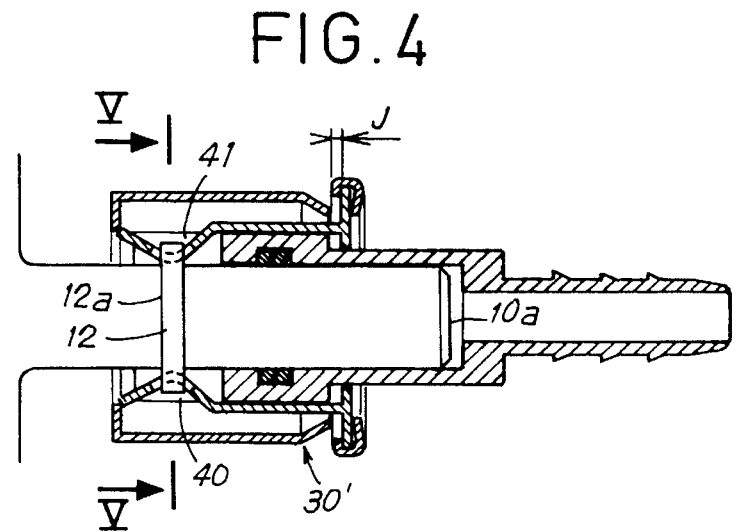
FIG. 4 is a section similar to those of FIGS. 2 and 3, showing the locking means in their locking configuration.
Figure 5:
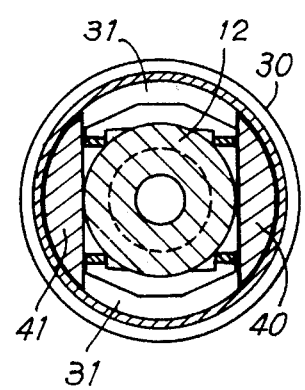
FIG. 5 is a section along line V—V of FIG. 4.

As shown in FIGS. 4 and 5, the distance from the slots to the axis of the connector remains less than the radius of the swell in the configuration of locking of the lugs.

Figure 7:
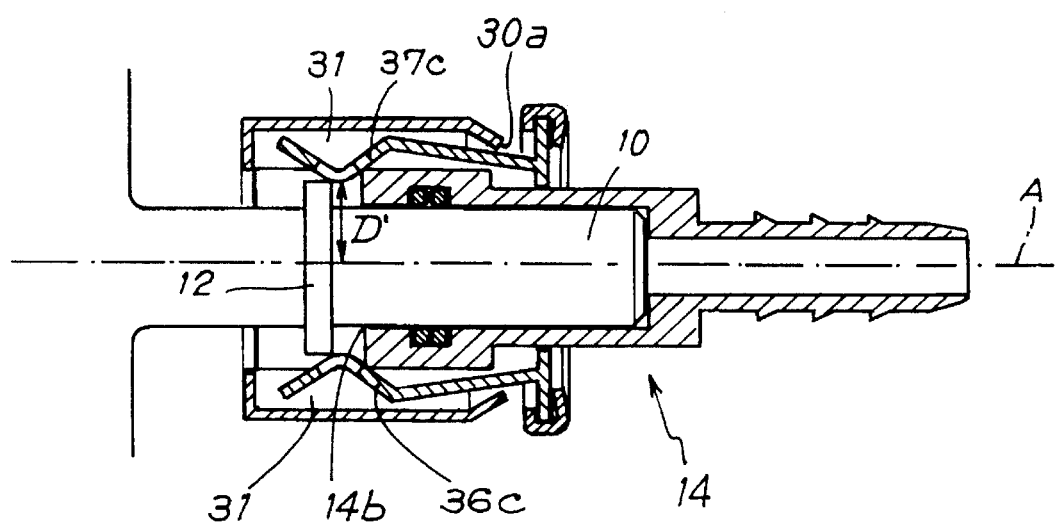
FIG. 7 is a section similar to FIGS. 2 to 4 and 6, when the connection is being unlocked.

Spacer means connected to the connector are provided to return the locking lugs in their configuration of unlocking. As shown in FIG. 7, in this configuration of unlocking, the distance D' from slot 37b to axis A of connector 14 is at least equal to the radius R of the swell 12 of tube 10. This is also valid for the distance from slot 36b to the same axis A.

These spacer means will be described in greater detail hereinafter.

Figure 8:
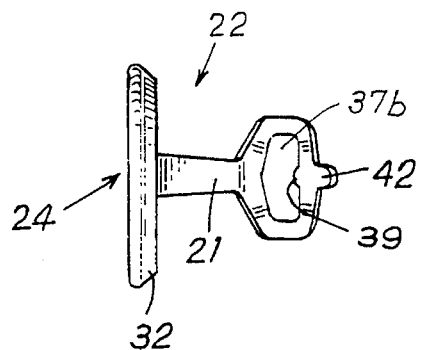
FIG. 8 shows, in elevation, the locking member in accordance with a first embodiment.
Figure 9:
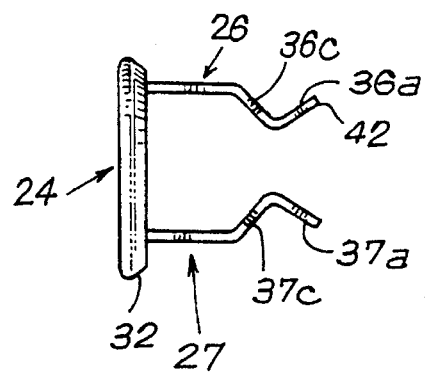
FIG. 9 is a plan view of FIG. 8.
Figure 12:
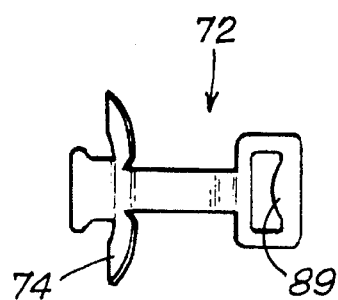
FIG. 12 shows, in elevation, the locking member in accordance with the second embodiment.
Figure 13:
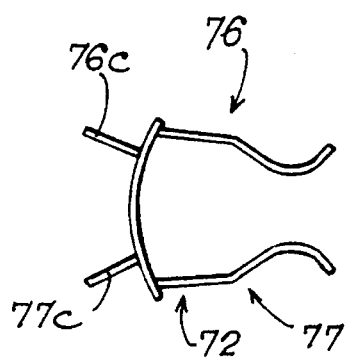
FIG. 13 is a plan view of FIG. 12.

As shown in FIG. 8, the front edge of slot 37b is advantageously provided with a rearwardly extending bearing catch 39. The term "catch" is here used generally to designate a camber of the edge of the slot, preferably located in its central region, such as the camber 89 visible in FIG. 12.

The presence of the bearing catch allows a tangential or substantially tangential contact to be made between the front edge of the slots 36b or 37b and the front face 12a of the swell of tube 10. When the connector is pulled rearwardly with respect to the tube while rotating it, this prevents the front face of the swell from performing, for the front edge of the slot, the role of a guide track which might cause the locking lug to move away from its position of locking.

The connection advantageously comprises a sleeve 30, covering the connector 14 and mounted on support means fast therewith. This sleeve extends axially towards the front, beyond the entry 14b of the connector, and itself presents an entry 30b whose diameter is at least equal to that of the swell 12 and which is coaxial to said entry 14b.

The sleeve 30 thus constitutes a protection cap and form at least one chamber 31, particularly visible in FIG. 5, adapted to contain and protect each of the locking lugs. Whether they are in their configuration in the free state, illustrated in FIG. 2, in their configuration of locking, illustrated in FIGS. 4 and 5, or in their configuration of unlocking, illustrated in FIG. 7, the locking lugs 26 and 27 remain protected by sleeve 30.

In this way, only those elements of the locking member capable of projecting beyond the sleeve are either safety devices as will be seen hereinafter, or mobile elements enabling the means for spacing the lugs apart to be employed, by a precise manoeuvre.

In the examples shown, the sleeve 30 is fixed axially with respect to the connector 14, and the means for supporting this sleeve comprise at least one forward extension of the connector. In fact, as there are two locking lugs here, two forward extensions in the form of cylindrical sectors have been shown, clearly visible in FIG. 1, under references 40 and 41, between which the second portions of the lugs extend.

These extensions 40 and 41 extend axially, forwardly, beyond the entry 14b of the connector 14, over a length at least equal to the length of the second portion 26b or 27b of the locking lugs. The outer radial dimensions of the extensions 40 and 41 are greater than those of the second part of the connector, the space thus created in the region of the extensions, between the inner periphery of the sleeve 30 and the outer periphery of the second part 20 of the connector, constitutes the chamber 31.

The front end of the sleeve 30 is crimped on the front and rear ends of the extensions 40 and 41.

In the example shown, the extensions each cover about one quarter of the periphery of the second part of the connector and lie opposite one another. It is also possible to provide only one forward extension, which would cover half or more of this periphery. In that case, only one chamber would be constituted for the locking lug(s).

According to another embodiment (not shown), the forward extensions may extend over a lesser distance beyond the entry of the connector and the sleeve may be axially mobile, with a front end bent and a rear end crimped on the ring 24 of the locking member. The assembly constituted by the sleeve and the locking member of FIGS. 2 to 9 would thus be axially mobile and the employment of the locking means would be identical to that described hereinafter with reference to FIGS. 1 to 9.

However, in the example shown in these Figures by way of advantageous embodiment, only ring 24 is mounted to slide on the first part 18 of the connector 14. The forward extensions 40 and 41 extend along the second part 20 of the connector, over at least a part of the axial length of this second part, and the rear of the sleeve 30 is crimped (at 30') on the rear end of these extensions, while leaving sufficient room for the passage of the locking lugs and for their movement with respect to the connector and the fixed sleeve, when the ring is made to slide. The axial stop means may therefore be constituted, as desired, by the shoulder 19 or by the rear end 30a of the sleeve 30.

FIG. 3 shows the position of the locking lugs when the tube is fitted in the connector. It is observed in this Figure that these lugs move apart under the effect of the cooperation between the front ramps 36a, 37a and the annular swell 12 of the tube or, more precisely, the rear face of this swell.

FIG. 4 shows the locking lugs in their configuration of locking, in which the swell 12 of the tube is housed in the transverse slots 36b, 37b. It is seen that, in this position, and when the ring 24 is mounted to slide with respect to the connector 14 and to the sleeve, there exists a clearance j between the rear end of the sleeve 30 and the front face of the ring 24.

The situation of the various elements of the connection, when the locking means are in their configuration of locking, is also visible in FIG. 5.

The clearance j may be eliminated under the effect of the pressure of the fluid which passes through the connection, or a manipulation of an operator attempting to separate the tube and the connector by simply pulling on the latter. Unlocking of the connection is prevented by the cooperation of the front edge of the slot 36b or 37b, or more precisely of the catch 39, with the front face of the swell 12.

However, an additional safety device may be provided, constituted by a front catch 42 of the lugs, more clearly seen in FIG. 8. This so-called "retaining catch" extends forwardly on the front end of the second portion of the locking lugs.

Figure 6:
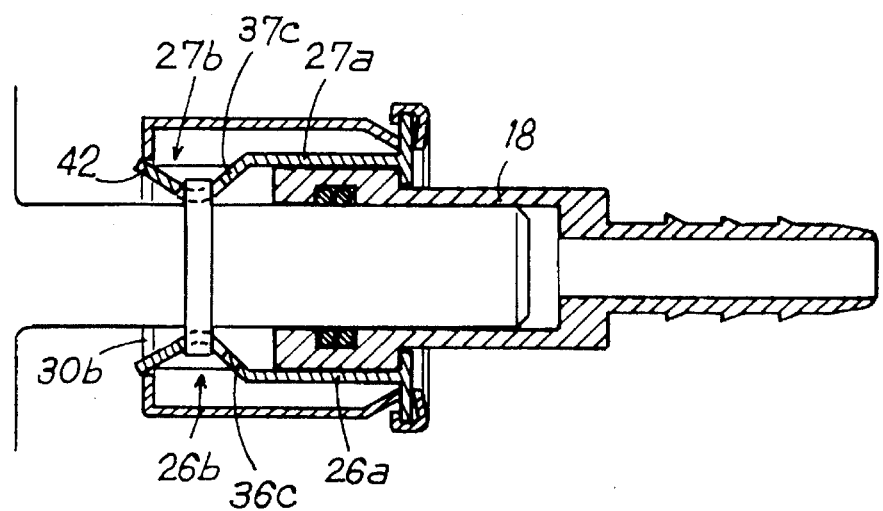
FIG. 6 is a section similar to those of FIGS. 2 to 4, showing the configuration of the locking means when a traction effort intended to separate the connection and the connector is exerted.

As shown in FIG. 6, when clearance j is eliminated, the retaining catch 42 cooperates with the front edge of the entry 30b of the sleeve 30 to maintain the locking lugs in their locked position, preventing them from moving apart.

In the embodiment illustrated in FIGS. 2 to 9, the ring 24 is mounted to slide on the first cylindrical part 18 of the connector 14. In that case, the spacer means comprise a rear ramp 36c or 37c of each locking lug, inclined outwardly from slots 36b, 37b.

Each of the rear ramps 36c and 37c is provided on the second portion of the corresponding locking lug, 26 or 27, on the side opposite the front ramp 36a or 37a with respect to the transverse slot 36b or 37b. For each lug, the rear ramp is connected to the first portion and, as shown in FIG. 7, is intended to cooperate with the outer periphery of the entry 14b of the connector 14 to bring the lug into its configuration of unlocking, upon a relative displacement of the ring 24 and of the connector leading to guiding this ring rearwardly.

In this embodiment, unlocking is effected simply, without using a tool, but not fortuitously, since this operation obliges maintaining the connector forwardly, while displacing the sliding ring rearwardly. Moreover, when the front retaining catch 42 is provided, the situation of FIG. 6 prevents any rearward displacement of the ring. Such a displacement will be possible only after having returned to the situation of FIG. 4, pushing the connector forwardly, with the sleeve and the ring.

FIGS. 10 to 13 show a second embodiment of the connection, comprising different means for spacing the lugs apart.

In these Figures, the elements remaining unchanged, such as the tube and the connector, conserve their references of FIGS. 1 to 9, while the slightly modified elements such as the sleeve and the locking members, will have the same references as in FIGS. 1 to 9, increased by 50.

The locking member 72 comprises a ring 74 and two locking lugs 76 and 77 which each comprise a first portion 76a, 77a, a second portion 76b, 77b, a front ramp 86a, 87a and a transverse slot 86b, 87b.

The locking lug 77 is extended rearwardly, beyond the ring 74, by a control lug 77c, which forms therewith a relatively rigid assembly. Similarly, the locking lug 76 may comprise a control lug 76c similar to the control lug 77c.

Figure 10:
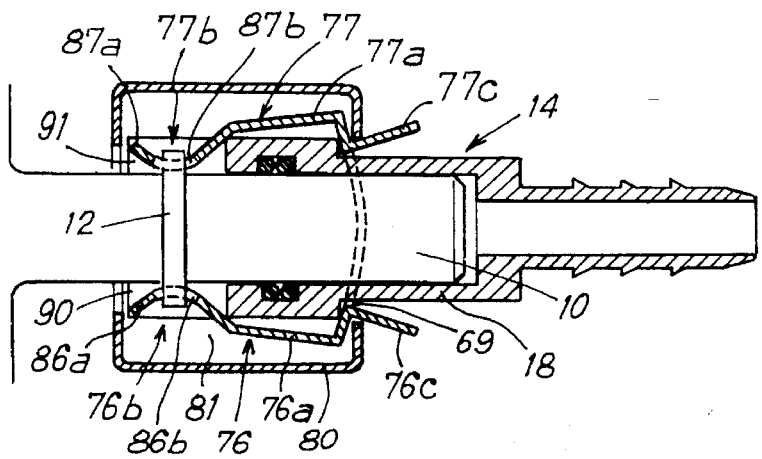
FIG. 10 is a view in section of a locked connection, provided with a locking member in accordance with a second embodiment.

In its configuration in the free state, or in its configuration of locking illustrated in FIG. 10, the rear end of the control lug 76c or 77c is spaced apart from the outer periphery of the first part 18 of the connector 14.

Figure 11:
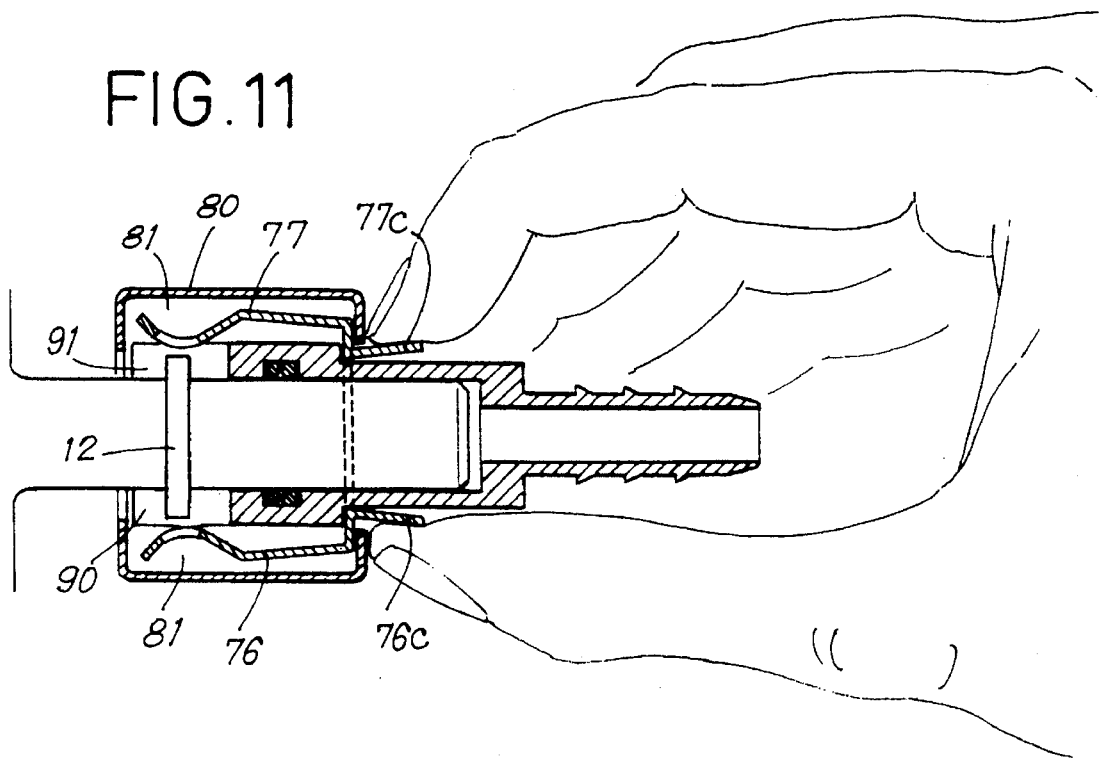
FIG. 11 is a section similar to FIG. 10 when the locking member is being unlocked.

In order to unlock the connection, it suffices, as indicated in FIG. 11, to bring the control lugs closer to the outer periphery of the first part 18 of the connector 14. Being given the relative rigidity of the assembly constituted by the locking assembly, this movement of approach causes the locking lugs to pivot about a fixed point lying at the level of the ring 74 to bring it into its spaced apart configuration.

In fact, as a comparison of FIGS. 10 and 11 will show, the ring 74 performs a spring effect and is incurved in the axial direction of the connector in the configuration of the locking member in the free state, while it may be returned into a radial plane as in FIG. 11 to unlock the connection.

The expression "relatively rigid" is used to indicate that, when the control lugs are returned towards the periphery, their point of connection to ring 74 does not constitute a zone of bending, without which no movement would be transmitted to the locking lugs. On the contrary, the angle between the control lugs and the plane of the ring does not vary, or very little, which, by returning this ring into a radial plane, makes it possible to move the locking lugs apart.

The fixed pivoting point lies in the vicinity of the point of attachment of the control lugs and of the ring 74. As shown in FIG. 10, this point of attachment lies substantially level with the inner periphery of the ring 74, while the locking lugs are connected near the outer periphery of this ring.

The means for axial stop of ring 74 may be constituted by the shoulder 19 mentioned above of the outer periphery of the connector 14. The rear end of the sleeve 80 may be crimped on the ring so as to block it against this shoulder 19. The fixed pivoting point is defined, for each assembly constituted by a locking lug and the aligned control lug, by the portion of the ring 74 thus maintained fixed.

What is claimed is:

1. A connector for connecting a free end of a rigid tube to a free end of a pipe, said connector comprising:

a) an annular swell surrounding the rigid tube at a predetermined axial distance from the free end of the rigid tube; and b) a connection element attached to the free end of the pipe for joining the pipe and the rigid tube in fluid communication, said connection element including:
   i) a generally tubular connector housing defining a longitudinal aperture extending from the pipe to a free end of said connector housing for receiving the free end of the rigid tube such that said annular swell is positioned adjacent the free end of said connector housing;
   ii) an O-ring positioned in said connector housing for contacting the rigid tube between said swell and the free end of the rigid tube;
   iii) a locking ring mounted on an intermediate segment of said tubular connector housing;
   iv) a stop means formed on said tubular connector housing between said locking ring and the free end of said tubular connecting housing for retaining said locking ring;
   v) at least one locking lug connected to said locking ring and extending axially across said stop means and past the free end of said connector housing, said locking lug being elastically deformable in a radial direction and having an inwardly-angled front ramp at a free end of said locking lug;
   vi) a transverse slot means formed in said locking lug adjacent the front ramp for receiving and securing said annular swell when the free end of the rigid tube is positioned in the aperture of said tubular connector housing; and
   vii) a spacer means for selectively deforming said locking lug in a radially outward direction to release said annular swell from said transverse slot.

2. The connector defined in claim 1, wherein said transverse slot means includes a bearing catch formed in said transverse slot means to engage said annular swell.

3. The connector defined in claim 1, including support means mounted on said tubular connector housing, said support means including a tubular sleeve for forming a chamber to enclose said locking lug.

4. The connector according to claim 3, wherein said tubular sleeve includes at least one forward extension extending axially beyond the free end of said tubular connector housing, a front end of said forward extension being crimped radially inwardly.

5. The connector according to claim 4, wherein said locking ring is slidably mounted on said tubular connector housing, and a rear end of said tubular sleeve is crimped radially-inwardly.

6. The connector according to claim 4, wherein said locking lug includes a retaining catch formed at the free end of said locking lug, said retaining catch cooperating with the forward end of said tubular sleeve to maintain said locking lug with said transverse slot about said annular swell.

7. The connector according to claim 1, wherein said locking ring is slidably mounted on said tubular connector housing and said spacer means includes an outwardly-angled rear ramp formed in said locking lug adjacent the front ramp at the free end of said locking lug such that said transverse slot is positioned at an approximate junction of the rear ramp and the front ramp, said front ramp cooperating with the free end of said tubular connecting housing to deform said locking lug in a radially outward direction beyond said annular swell on the rigid tube.

8. The connector according to claim 1, wherein said locking lug includes a control lug means extending beyond said locking ring for selectively pivoting said locking lug about a fixed point on said locking ring for unlocking said locking lug.

9. The connector according to claim 8, including a tubular sleeve mounted on said tubular connector housing such that said tubular sleeve forms a chamber to enclose said locking lug and that said control lug means extends from said tubular sleeve, said tubular sleeve crimped radially inwardly at each end to retain said ring against said stop means.

10. The connector according to claim 1, wherein the pipe is a flexible pipe and said tubular connector housing includes a barbed connection for connection to the flexible pipe.

11. The connector according to claim 1, including two locking lugs connected to said locking ring, said locking lugs being spaced apart on said locking ring.

12. The connector according to claim 1, including a crimping ring connected to said locking ring.

13. The connector according to claim 1, wherein said stop means includes a shoulder formed on the periphery of the tubular connecting housing.

\* \* \* \* \*